US006215908B1

(12) United States Patent
Pazmino et al.

(10) Patent No.: US 6,215,908 B1
(45) Date of Patent: Apr. 10, 2001

(54) SYMMETRIC FILTERING BASED VLSI ARCHITECTURE FOR IMAGE COMPRESSION

(75) Inventors: Edward A. Pazmino, Los Angeles, CA (US); Tinku Acharya, Tempe; David K. Vavro, Chandler, both of AZ (US)

(73) Assignee: Intel Corporation, Santa Calra, CA (US)

( * ) Notice: Subject to any disclaimer, the term of this patent is extended or adjusted under 35 U.S.C. 154(b) by 0 days.

(21) Appl. No.: 09/258,118

(22) Filed: Feb. 24, 1999

(51) Int. Cl.[7] .............................. G06K 9/36; G06K 9/46
(52) U.S. Cl. ................... 382/240; 375/240.19; 382/263; 382/264
(58) Field of Search .............................. 341/79; 345/505, 345/508; 348/397.1, 398.1, 403.1, 408.1, 437.1, 438.1; 375/240.1, 240.11, 240.18, 240.19; 382/232, 234, 240, 248, 260, 302–304, 263–264; 708/308, 400–401, 406–407

(56) References Cited

U.S. PATENT DOCUMENTS

| 4,829,585 | * | 5/1989 | Pape ...................................... 382/304 |
| 4,943,855 | * | 7/1990 | Bheda et al. ..................... 375/240.11 |
| 5,706,220 | | 1/1998 | Vafai et al. ......................... 364/24.05 |
| 5,889,559 | | 3/1999 | Yang ..................................... 348/398 |
| 5,999,656 | * | 12/1999 | Zandi et al. ......................... 382/240 |

OTHER PUBLICATIONS

Kim, Image compression using biorthogonal wavelet transforms with multiplierless 2–D filter mask operation, 10/1997, pp. 648–651, IEEE Image Processing.*

A High Speed Reconfigurable Intergrated Architecture for DWT, Global Tlecommunications Conference, New York, IEEE, Nov. 9, 1997, pp. 669–673 Achayra.

Fast and Low roundoff Implementation of Quadrature Mirror Filters for Subband Coding, IEEE Transactions on Circuits and Systems for Video Technology, IEEE Inc., New York, vol. 5, No. 6, Dec. 1, 1995, pp. 524–532 Yang et al.

A VLSI Architecture for Separable 2–D Discrete Wavelet Transform, Journal of VLSI Signal Processing, NL, Kluwer Academic Publishers, vol. 18, No. 2, Feb. 1, 1998, pp. 125–139 Limqueco et al.

\* cited by examiner

Primary Examiner—Amelia Au
Assistant Examiner—Timothy M. Johnson
(74) Attorney, Agent, or Firm—Blakely, Sokoloff, Taylor & Zafman LLP

(57) ABSTRACT

An apparatus to perform symmetric filtering image compression is provided. The apparatus includes an N-element shift circuit, that has N shifting blocks (SB), to store and shift data elements. Each data element represents a pixel of an image. The apparatus also includes a first plurality of adder circuits to add data elements from a first plurality of pairs of SBs of the N SBs. The apparatus further includes a second plurality of adder circuits to add data elements from a second plurality of pairs of SBs of the N SBs. Additionally, the apparatus includes a first plurality of multiplier circuits, to multiply by corresponding low pass coefficients results of additions performed by the first plurality of adder circuits. The apparatus also includes a second plurality of multiplier circuits, to multiply by corresponding high pass coefficients results of additions performed by the second plurality of adder circuits.

25 Claims, 8 Drawing Sheets

SYMMETRIC FILTERING BASED VLSI ARCHITECTURE FOR IMAGE COMPRESSION

BACKGROUND (1) Field

The present invention relates to signal/image processing. More specifically, the present invention relates to image compression.

(2) Background Information

Using traditional Fourier analysis transforms, any signal may be approximated as a sum of sinusoidal waveforms of assorted frequencies. While Fourier transforms are ideally suited for signals having repeated behavior, such as speech signals, Fourier transforms fail to efficiently approximate signals with sharp discontinuities such as the edge features of images, or signals encoded for digital communications.

Wavelets are used as a way to represent an image in both the frequency and spatial domain. Due to quantization effects, less visual side effects are produced when using wavelets compared to a block based discrete cosine transform (DCT). A transform, similar to the Fourier transform, Discrete Wavelet Transform (DWT), based on Wavelet analysis, has been developed to represent signals with discontinuous features. The DWT is a "discrete" algorithm, that rather than approximating a signal using continuous waveforms, approximates the signal by discrete samples of waveforms. Since the transform is discrete, the DWT may be implemented using digital logics such as Very Large Scale Integrated (VLSI) circuits. Thus DWT may be integrated on a chip with other digital components.

The essence of DWT is to decompose an input signal into two or more frequency sub-bands. An input signal may be decomposed into two outputs—a low frequency sub-band output, obtained by using a low-pass filter, and a high frequency sub-band output, obtained by using a high-pass filter. Each of these sub-bands may be encoded separately using a suitable coding system. Each sub-band may further be divided into smaller and smaller sub-bands as is required.

In general, DWT is a computationally very intensive process and hence very slow when computed using a general purpose computing system. To make it suitable for real-time applications, a special purpose custom VLSI chip may be used for DWT, exploiting the underlying data parallels to yield high throughput and hence high data rate. Several VLSI architectures for DWT have been proposed. However, most of these complex architectures require large hardware area and yield much less than 100 percent hardware utilization. It is desirable to provide a new DWT architecture for performing image compression that utilizes a reduced number of hardware parts.

SUMMARY

Briefly, in one embodiment, the present invention provides an apparatus to perform symmetric filtering image compression. The apparatus includes an N-element shift circuit, that has N shifting blocks (SB), to store and shift data elements. Each data element represents a pixel of an image. The apparatus also includes a first plurality of adder circuits to add data elements from a first plurality of pairs of SBs of the N SBs. The apparatus further includes a second plurality of adder circuits to add data elements from a second plurality of pairs of SBs of the N SBs. Additionally, the apparatus includes a first plurality of multiplier circuits, to multiply by corresponding low pass coefficients results of additions performed by the first plurality of adder circuits. The apparatus also includes a second plurality of multiplier circuits, to multiply by corresponding high pass coefficients results of additions performed by the second plurality of adder circuits.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION

Figure 1:
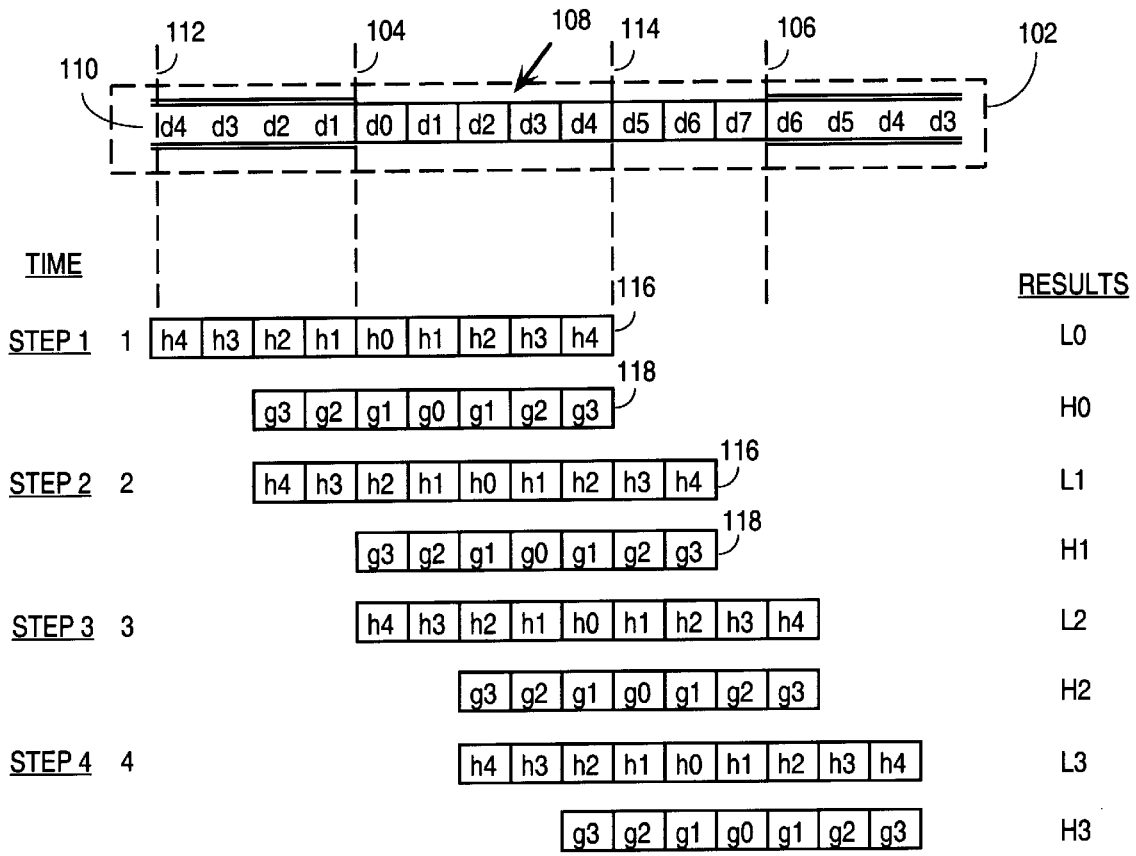
FIG. 1 is a block diagram illustrating basic steps involved in the filtering operation implemented by the apparatus according to the present invention.

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Discrete wavelet transform (DWT) based image compression is usually a computationally expensive process. Selection of a basis function is an important criteria to achieve expected performance and for efficient implementation. In one embodiment of the present invention, a 9–7 biorthogonal Spline filtering based DWT that is suitable for image compression applications is utilized. A symmetric filtering architecture is utilized for optimal implementation of this particular DWT-based image compression scheme.

A DWT decomposes an arbitrary data sequence (hereinafter referred to as "data elements") $d=\{d_0, d_1, \ldots d_n-1\}$ into a low-pass sub-band $$L = \left\{ L_0, L_1, \ldots, \frac{L_N}{2-1} \right\}$$

and a high-pass sub-band $$H = \left\{ H0, H1, \ldots, \frac{H_N}{2-1} \right\}$$

which can be represented as $$L_n = \Sigma h_{2n-k} d_k, \; H_n = \Sigma g_{2n-k} d_k$$

for n=0, 1, ... N/2−1
where $h_i$ and $g_i$ are the low-pass and high-pass filter coefficients respectively and $H_I$ and $L_I$ are data coefficients. The 9–7 biorthogonal spline filter based DWT, which is utilized in one embodiment of the present invention, is well known in the art and is suitable for image compression applications. The 9–7 biorthogonal spline filter has 9 low-pass filter coefficients $\{h_{-4}, h_{-3}, h_{-2}, h_{-1}, h_0, h_1, h_2, h_3, h_4\}$ and 7 high-pass filter coefficients $\{g_{-3}, g_{-2}, g_{-1}, g_0, g_1, g_2, g_3\}$. Using the 9–7 biorthongonal spline filter, the low-pass sub-band samples $L_n$ for n=0, 1, ..., N/2−1 may be expressed as,
$L_0 = h_0 d_0 + 2h_{-1} d_1 + 2h_{-2} d_2 + 2h_{-3} d_3 + 2h_{-4} d_4$,
$L_1 = h_2 d_0 + h_1 d_1 + h_0 d_2 + h_{-1} d_3 + h_{-2} d_4 + h_{-3} d_5 + h_{-4} d_6, +h_4 d_2 + h_3 d_1$
$L_2 = h_4 d_0 + h3 d_1 + h_2 d_2 + h_1 d_3 + h_0 d_4 + h_{-1} d_5 + h_{-2} d_6 + h_{-3} d_7 + h_{-4} d_8$ The other $L_i$ terms may be expressed in a similar fashion. Since low-pass filter coefficients are symmetric i.e., $h_{-i} = h_i$ the above presented $L_i$ terms for the low-pass sub-band may be rearranged in a fashion as follows:
$L_0 = h_0(0+d_0) + h_1(d_1+d_1) + h_2(d_2+d_2) + h_3(d_3+d_3) + h_4(d_4+d_4)$,
$L_1 = h_0(0+d_2) + h_1(d_1+d_3) + h_2(d_0+d_4) + h_3(d_1+d_5) + h_4(d_2+d_6)$,
$L_2 = h_0(0+d_4) + h_1(d_3+d_5) + h_2(d_2+d_6) + h_3(d_1+d_7) + h_4(d_0+d_8)$
and similarly the other $L_i$ terms.

Using the 9–7 biorthongonal spline filter, the high-pass sub-band samples $H_n$ for n=0, 1, ..., N/2−1 may be expressed as
$H_0 = g_0 d_1 + g_1(d_0+d_2) + g_2(d_1+d_3) + g_3(d_2+d_4)$,
$H_1 = g_0 d_3 + g_1(d_2+d_4) + g_2(d_1+d_5) + g_3(d_0+d_6)$
The other $H_i$ terms may be expressed in a similar fashion.

In one embodiment a one dimensional 9–7 biorthongonal-spline-filter-based DWT transforms a N-block of data into an N/2 high pass block of data and N/2 low-pass block of data. This process creates sub-bands that represent the image at different resolutions in varying significance to the human eye. The low-pass filter coefficients and high-pass filter coefficients are symmetrical, where $h_{-i} = h_i$ and $g_{-i} = g_i$.

The basic steps involved in a filtering operation are summarized in FIG. 1. In FIG. 1, incoming data elements $d_i$ are convolved with two filters: h, which is a 9-tap low-pass filter; and g which is a 7-tap high-pass filter. According to Nyquist's theory, as the resulting filtered representations do not contain the full frequency band width of the original image, one may reconstruct the filtered representation without utilizing all N elements. As a result, an apparatus of the present invention (not shown), based on the scheme of FIG. 1, performs a convolution on every other data element.

In Step 1, the following operations may be performed:
$L_0 = h_0 d_0 + h_1 d_1 2 + h_2 d_2 2 + h_3 d_3 2 + h_4 d_4 2$
$H_0 = g_0 d_1 + g_1(d_0+d_2) + g_2(d_1+d_3) + g_3(d_2+d_4)$
where L refers to the low pass coefficient and H to the high pass coefficient.

The operations shown above and performed in Step 1 may be easily understood in connection with the following blocks illustrated FIG. 1. FIG. 1 illustrates block 102 (shown within dotted lines) that includes a sub-block 108 of data elements $d_0$–$d_7$ demarcated by vertical dotted lines 104 and 106. Block 102 also includes sub-block 110 that includes data elements $d_1$, $d_2$, $d_3$, and $d_4$. Data elements $d_1$, $d_2$, $d_3$, and $d_4$ are symmetrically disposed about data element $d_0$. One reason that data is symmetrically disposed about $d_0$ is to reduce edge effects. Each data element $d_i$ is a 16-bit quantity that characterizes a pixel of an image, or the result of a previous filtering operation.

The block diagram illustrated in FIG. 1 illustrates in 4 steps how the low pass coefficients $h_0$, $h_1$, $h_2$, $h_3$ and $h_4$ and the high pass coefficients $g_0, g_1, g_2$ and $g_3$ are disposed relative to the block of data 102. Convolutions between the data elements $d_i$ and the coefficients $h_i$ and $g_i$ may be calculated more easily, when knowing how to dispose coefficients $h_i$ and $g_i$ with respect to the data elements $d_i$ of block 102.

Looking now at the sub-block of data demarcated by dotted lines 112 and 114, the result of the convolution between this block of data elements and the low pass coefficients $h_i$ may be calculated in the following way. One multiplies each low pass coefficient $h_i$ with its vertically corresponding data element $d_i$. As a result, the multiplication in the vertical direction from left to right yields the following results:

$h_4 d_4$, $h_3 d_3$, $h_2 d_2$, $h_1 d_1$, $h_0 d_0$, $h_1 d_1$, $h_2 d_2$, $h_3 d_3$, and $h_4 d_4$,
Adding the results of the multiplication horizontally, one may obtain the value:

$L_0 = h_0 d_0 + h_1 d_1 2 + h_2 d_2 2 + h_3 d_3 2 + h_4 d_4 2$.
By doing the same multiplication in the vertical direction and addition in the horizontal direction, the convolution between the high pass coefficients gi and data elements di gives rise to the following products:

$g_3 d_2$, $g_2 d_1$, $g_1 d_0$, $g_0 d_1$, $g_1 d_2$, $g_2 d_3$, $g_3 d_4$
Adding these results of the multiplication in a horizontal direction one obtains $H_0 = g_0 d_1 + g_1(d_0 + d_2) + g_2 (d_1+d_3) + g_3 (d_2+d_4)$.

At Step 2, the convolution is performed by shifting the blocks of low pass coefficients $h_i$ 116 and of high pass coefficients $g_i$ 118 by 2 places to the right as is shown in the figure at Step 2. At this step the results of the convolutions between the low pass coefficients $h_i$ and the data elements $d_i$ are calculated in the following way. The multiplication between hi and di in the vertical direction yields the following results:

$h_4 d_2$, $h_3 d_1$, $h_2 d_0$, $h_1 d_1$, $h_0 d_2$, $h_1 d_3$, $h_2 d_4$, $h_3 d_5$ and $h_4 d_6$.
The addition of these results produces:

L1=h0d2+h1(d1+d3)+h2(d0+d4)+h3(d1+d5)+h4(d2+d6).
Similarly, the high pass coefficient H1 is obtained by convolving di with the high pass coefficients gi shifted to the right by 2 relative to the previous high pass coefficients from Step 1. Therefore, the centers of both the low pass and high pass filter have moved two places over to the right. The resulting high pass coefficient H1 is:

H1=g0d3+g1(d2+d4)+g2(d1+d5)+g3(d0+d6).
One thing to note is the data in the double bordered boxes in FIG. 1. Since the filter is non-causal, one needs to account for this at the boundaries. One technique is to symmetrically extend the data around the boundaries to reduce boundary effects.

Figure 2:
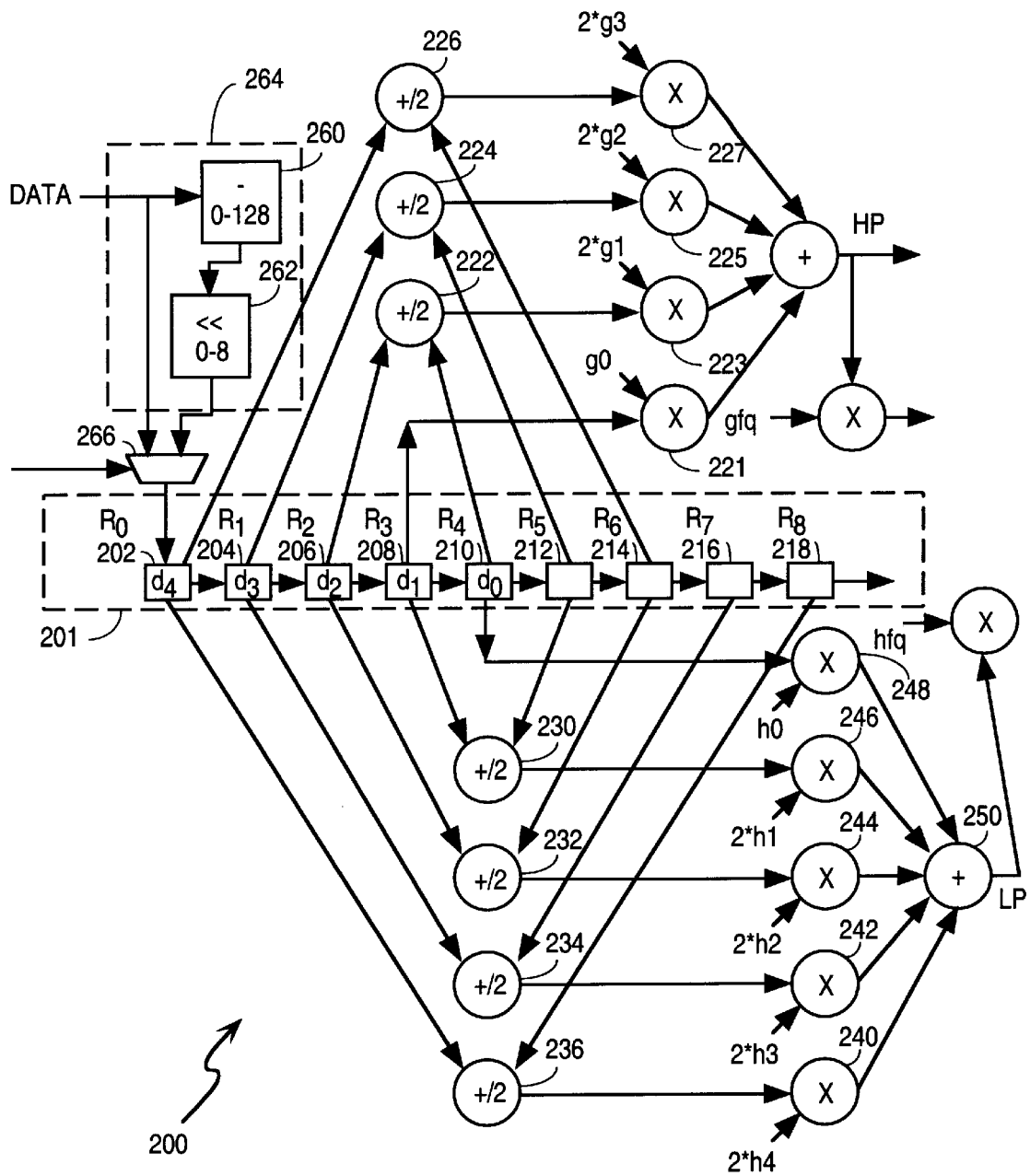
FIG. 2 is a block diagram illustrating the apparatus for performing symmetric filtering image compression according to one embodiment of the present invention.

FIG. 2 illustrates a high level block diagram of an embodiment 200 of an apparatus for performing symmetric filtering image compression according to the present invention. The apparatus 200 includes a N-element shift circuit 201, shown in dotted lines, that includes N shifting blocks. In one embodiment of the present invention, the N-element shift circuit 201 includes 9 shifting blocks 202, 204, 206, 208, 210, 212, 214, 216 and 218. The shifting blocks are configured to store data elements therein and to shift the data elements stored therein to a next shifting block. In one embodiment of the apparatus of the present invention each shifting block includes a shift register $R_i$. Shift registers $R_i$ are 16-bit shift registers to accommodate the 16-bit data elements $d_i$. Data elements such as $d_0,d_1,d_2$, etc., are shifted between successive registers Ri from left to the right in the figure.

Initially five data elements, $d_0$–$d_4$ are provided to circuit 264 which is explained later in this section. Circuit 264 outputs data elements $d_0$–$d_4$, passed through circuits 260 and 262, to a multiplexor 266. During the first pass, that includes steps 1–4, multiplexor 266 selects at an output thereof the data elements passed through circuits 260 and 262. Data elements $d_0$–$d_4$, output by multiplexor 266, are then shifted from left to right in the figure through registers $R_0$, $R_1$, $R_2$, $R_3$, $R_4$, such that at the end of the shifting operation $R_0$ stores $d_4$, $R_1$ stores $d_3$, $R_2$ stores $d_2$, $R_3$ stores $d_1$ and $R_4$ stores $d_0$.

Figure 3:
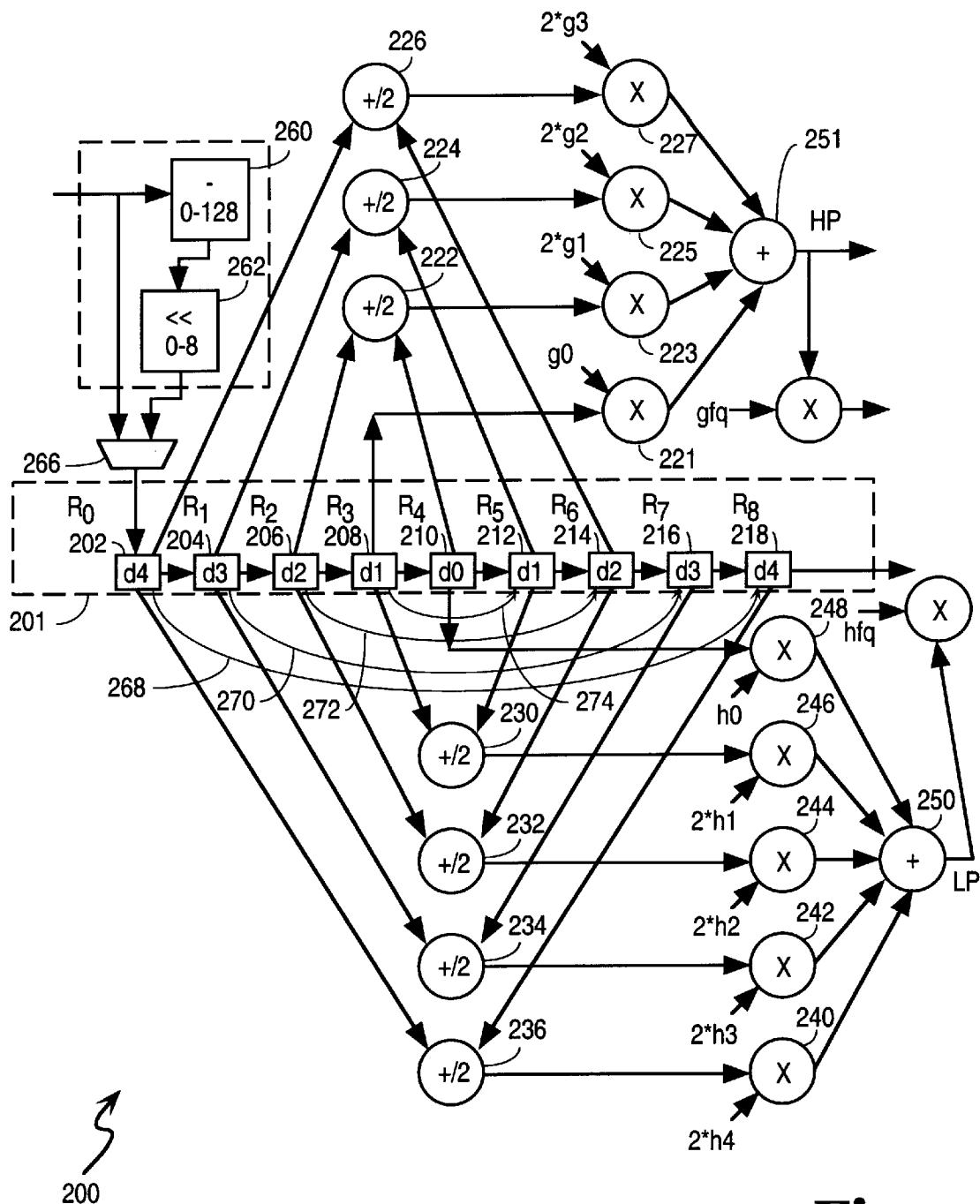
FIG. 3 is a block diagram illustrating the apparatus shown in FIG. 2 where data elements shifted to the right by 2 and two additional data elements added.

FIG. 3 illustrates in diagrammatic form the configuration of apparatus 200 with data elements $d_0,d_1,d_2,d_3$ and $d_4$ symmetrically stored in apparatus 200. After data elements $d_0$–$d_4$ are stored in registers R4–R0 respectively, as shown in FIG. 2, data elements R3, R2, R1 and R0 are symmetrically copied into registers R5, R6, R7, and R8, respectively about register R4 as the arrows 268, 270, 272 and 274, indicate. More specifically, $d_1$ is copied from R3 to R5, $d_2$ is copied from R2 to R6, $d_3$ is copied from R1 to R7 and $d_4$ is copied from R0 to R8.

The apparatus 200 has the hardware support to perform symmetric copying. The implementation of the hardware support to symmetrically copy data elements about register R4 is not explained herein as it is within the ambit of the knowledge of persons having ordinary skills in the art. The first pass is performed to obtain the low and the high pass filter coefficients L0, H0, L1, H1, L2, H2, L3, H3, L4, H4. In the second pass instead of taking data elements $d_0$–$d_7$ and passing them through registers R0–R8 of the apparatus according to the present invention, elements L0, L1, L2, L3, L4, H0, H1, H2, H3, H4 are passed directly through registers R0–R8 and the respective operations explained above are performed on these elements. The operations of symmetrically copying data about center register R4 lead to a sequence of data elements stored in registers R0–R8. This sequence is the same as the sequence of data elements shown in FIG. 1 in the block demarcated by dotted lines 112 and 114. In FIG. 1, data elements disposed within lines 112–114 are extended symmetrically about $d_0$, i.e., the portion of 4 data elements at the left of $d_0$ is the mirror image of the portion of data elements at the right of $d_0$.

The operations for obtaining the low pass coefficient $L_0$ by way of apparatus 200 include the following. Data elements stored in each symmetric pair of registers $(R_3,R_5)$, $(R_2,R_6)$, $(R_1,R_7)$ and $(R_0,R_8)$ are added therebetween in corresponding circuits 230, 232, 234 and 236 which are coupled to the above-mentioned symmetric pairs of registers. Hereinafter, circuits 230, 232, 234 and 236 are called "add-dividers" as these circuits provide two functionality's: adding the pairs of data elements from the pairs of symmetrically extended registers, coupled to the add-divider; and dividing the result of the addition by 2 by extracting the 16 most significant bits. The reason for the division by 2 is that the addition of two 16-bit data elements gives rise to a 17-bit result. Since the logic of the apparatus illustrated in FIGS. 2–7 utilizes 16 bit buffers, the 17 bits are reduced to 16 bits by shifting out one bit from the left to the right. This is analogous with division by 2.

The apparatus of FIG. 3 further includes a plurality of first multipliers 240, 242, 244, 246 and 248. Multipliers 240, 242, 244, and 246 are coupled to corresponding add-dividers 236, 234, 232, and 230 respectively. These multipliers multiply the low pass coefficients h1, h2, h3 and h4 with the result obtained by the operations performed by the add-dividers, i.e., addition of two symmetrical data elements and division of the result of the addition by 2. Moreover, the low pass coefficients $h_1$–$h_4$ are multiplied by 2 to compensate the division by 2 of the result of the addition of the symmetric data elements. After these operations are performed, multipliers 240–246 produce at the output ports thereof, values $2h_4d_4$, $2h_3d_3$, $2h_2d_2$ and $2h_1d_1$ respectively. Data element $d_0$ is multiplied by $h_0$ in multiplier 248 coupled to register R4. Multipliers 248, 246, 244, 242 and 240 are coupled to adder 250 that adds the results of the multiplications by the multipliers. The result of the addition, in adder 250, is the first low pass coefficient $L_0$ which is equal to $h_0d_0+2h_1d_1+2h_2d_2+2h_3d_3 2 +2h_4d_4$.

The apparatus of FIGS. 2 and 3 also calculates the high pass coefficient H0. Data elements of a plurality of pairs of registers are added together. Data elements of registers R2 and R4 are added together in an add-divider 222. Data elements of registers R1 and R5 are added together in add-divider 224. Data elements of registers R0 and R6 are added together in add-divider 226. The add-dividers mentioned above are configured to add pairs of data elements that are coupled thereto and then to divide the result of the addition by 2. Accordingly, after adding two data elements, from symmetrically disposed shift registers, add-dividers 222, 224, and 226 are configured to divide the result of the addition by two. In the particular example explained herein in connection with the embodiment illustrated in FIG. 3, data elements $d_0$ and $d_2$ are added in add-divider 222 and the result of the addition is divided by 2. Data elements $d_3$ and $d_1$ are added in add-divider 224 and the result of the addition is divided by 2. Data elements $d_4$ and $d_2$ are added in add-divider 226 and the result of the addition is divided by 2.

After the above-mentioned operations are performed, the results of these operations are multiplied by 2g3, 2g2 and 2g in multipliers 227, 225 and 223 respectively. The data element d1 from register 4 is multiplied by the coefficient g0 in multiplier 221. The results of the multiplications are then added in adder 251. Adders 250 and 251 include 32 bit accumulators that store the results of the additions. The results of the addition from adder 250 are then multiplied by the coefficient hfq and the results of the addition in block 251 is multiplied by coefficient gfq. Multiplications by gfq and hfq represent how the accumulated results may be quantized prior to outputting the results. Quantization is a step down in image compression to reduce the range of incoming data by multiplying the element by a fraction.

The apparatus 200 according to the present invention takes advantage of the symmetrical configuration of the stored data elements di and of the low and high pass coefficients. Due to the symmetrical configuration, only one multiplication is performed instead of two multiplications.

Figure 4:
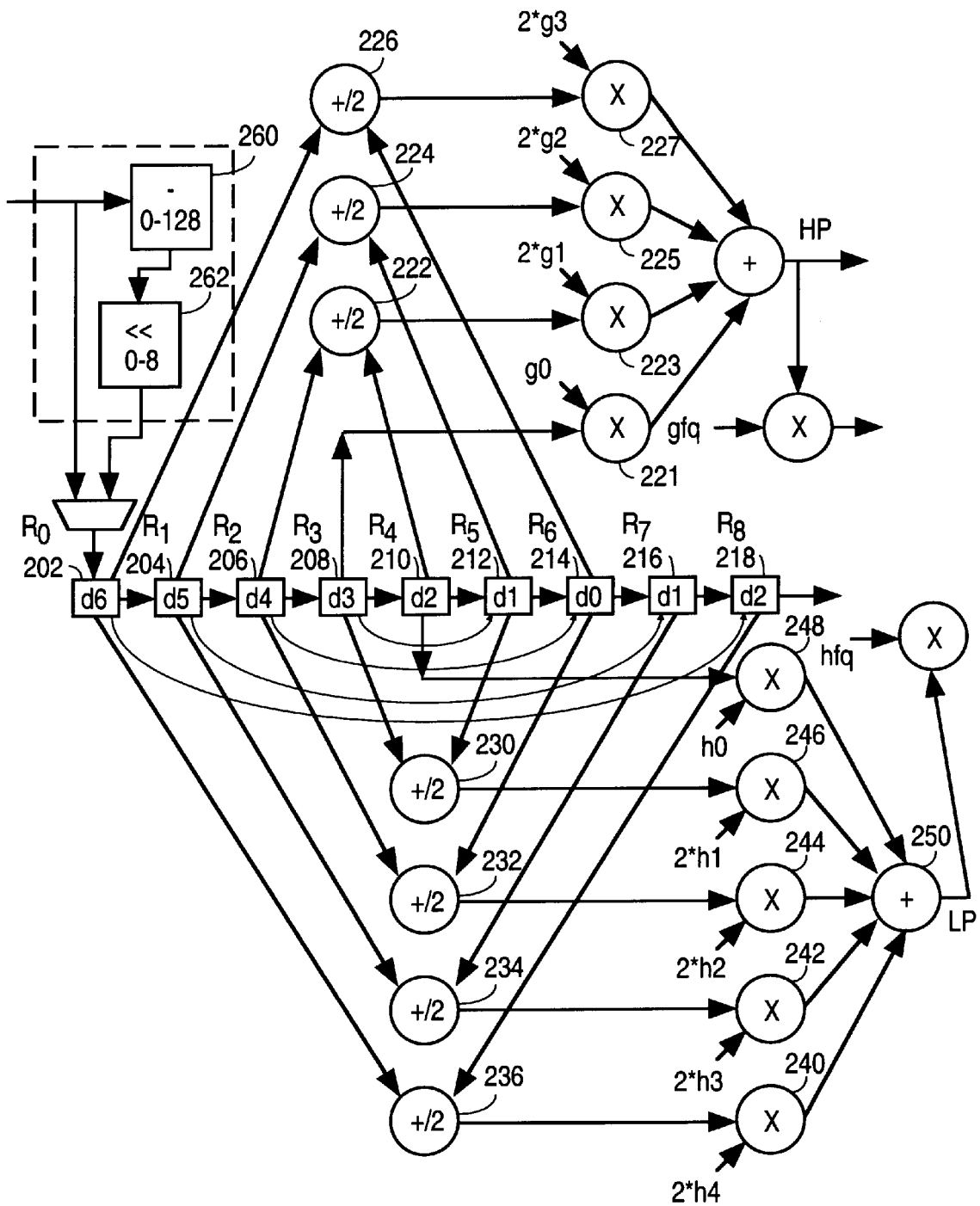
FIG. 4 is a block diagram illustrating the apparatus of FIG. 3 where data elements are shifted to the right by 2 and two additional elements are added.

FIG. 4 illustrates the apparatus of FIG. 3 where data elements are shifted to the right by 2 by the shifting circuit 201. Data elements $d_5$ and $d_6$ are shifted into register R1 and R0 respectively.

The configuration shown in FIG. 4 produces, at Step 2, the low pass and high pass coefficients L1 and H1. In this case $d_2$ stored in register R4 is multiplied in multiplier 248 by low pass coefficient h0. Data elements d1 and d3 stored in symmetrically disposed registers R5 and R3 are added by add-divider 230 and the result divided by 2. The result of the addition divided by 2 is then multiplied in multiplier 246 by the quantity $2h_1$. Data stored in registers R2 and R6, i.e., $d_4$ and $d_0$, respectively is added by the add-divider 232 and the result is divided by 2. After that, the result of the addition is multiplied by $2h_2$ in multiplier 244. Data in registers R7 and R1, i.e., $d_1$ and $d_5$, respectively, is added by add-divider 234 and then the result of the addition is divided by 2. The result of the addition is then multiplied by $2h_3$ in multiplier 242. Last, data stored in registers $R_0$ and $R_8$, $d_6$ and $d_2$ respectively, is added by add-divider 236 and the result is divided by 2. The result of the addition is provided to multiplier 240 that multiplies it with the quantity 2×h4. The results of the multiplication operations output by multipliers 240, 242, 244, 246 and 248 are added in adder 250 to produce the quantity $L_1$. Data stored in registers R0–R8 is subjected to similar operations performed by add-dividers 226, 224, 222 and multipliers 227, 225, 223 and 221 to obtain high pass coefficient H1.

Figure 5:
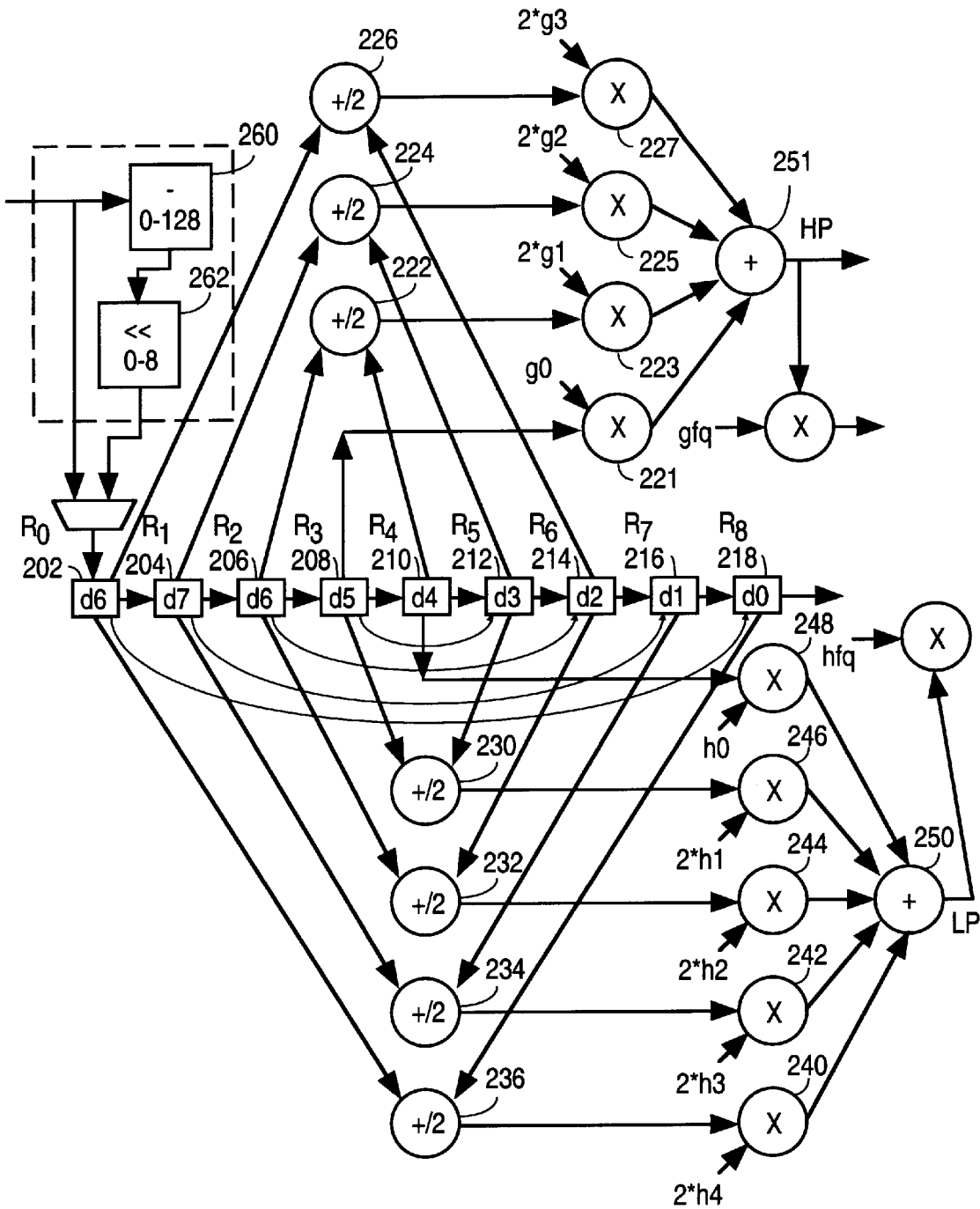
FIG. 5 is a block diagram illustrating the apparatus of FIG. 4 where data elements stored therein are shifted to the right by 2 and two additional data elements are added.

FIG. 5 illustrates the apparatus of FIG. 4 where data elements stored in registers R0–R8 are shifted to the right by 2 and new data elements d7 and d6 are stored in registers R1 and R0 respectively. The rest of the operations concerning additions between data elements and division by 2, multiplication with low and high pass coefficients hi and gi, and addition of the results by adders 250 and 251 are the same as the operations explained above in connection with the description of the previous figures.

Figure 6:
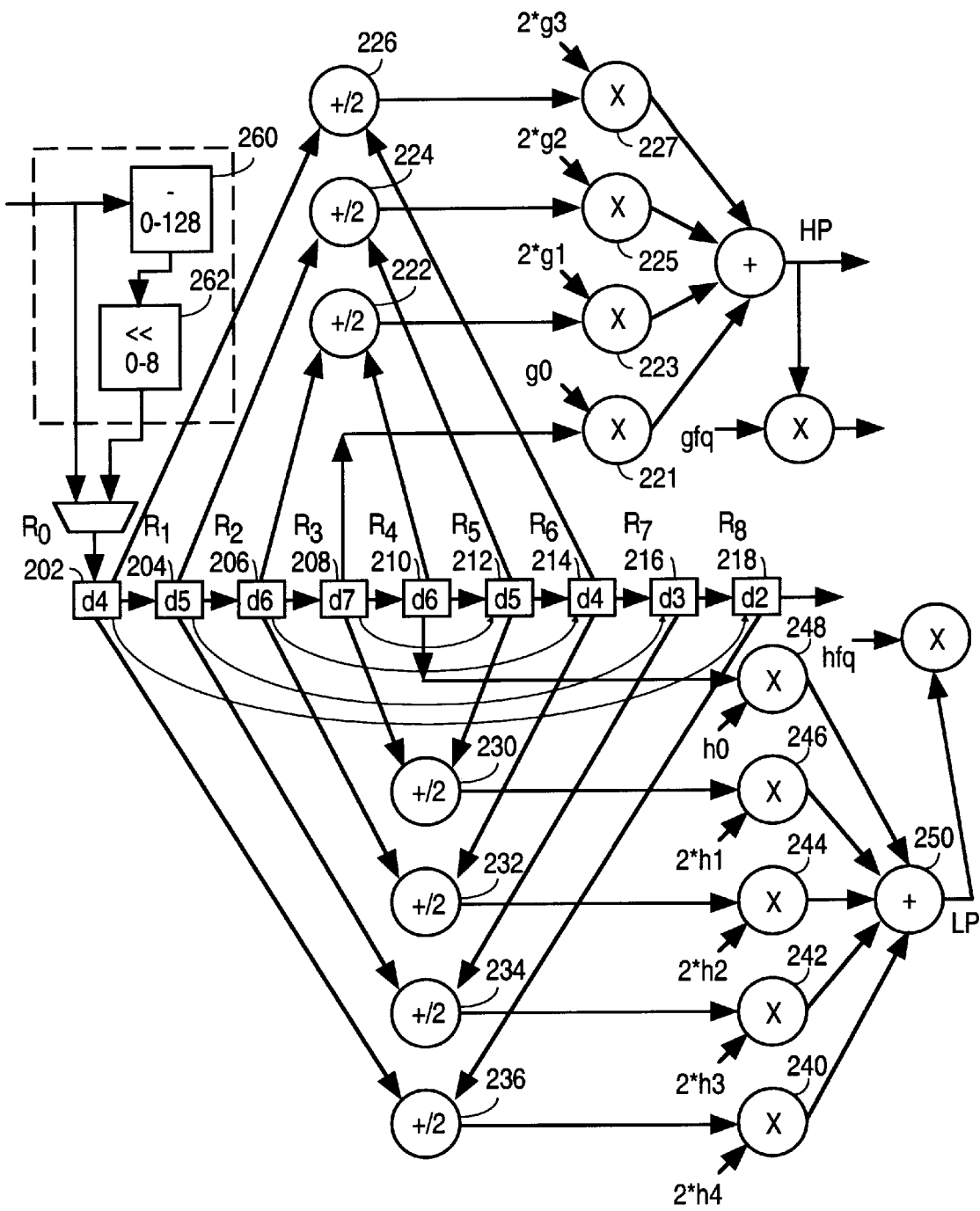
FIG. 6 is a block diagram illustrating the apparatus of FIG. 5 where data elements are shifted to the right by 2 and two data elements are added.

FIG. 6 illustrates the apparatus of FIG. 5 where data elements stored in registers R0–R8 are shifted to the right by 2. Data elements d5 and d4 are stored in registers R1 and R0 respectively. Since d7 represents the last piece of data in this example, the apparatus starts symmetrically copying data around d7 to wrap up calculations.

Low pass coefficients L0–L4 and high pass coefficients H0–H4 may be obtained after data elements are passed through the shift circuit 201 of the apparatus 200 and the operations explained earlier in connection with additions and multiplications are performed. More passes made with L0–L4 and H0–H4 may then be performed by way of the apparatus 200 and the methodology of processing data explained above.

Figure 7:
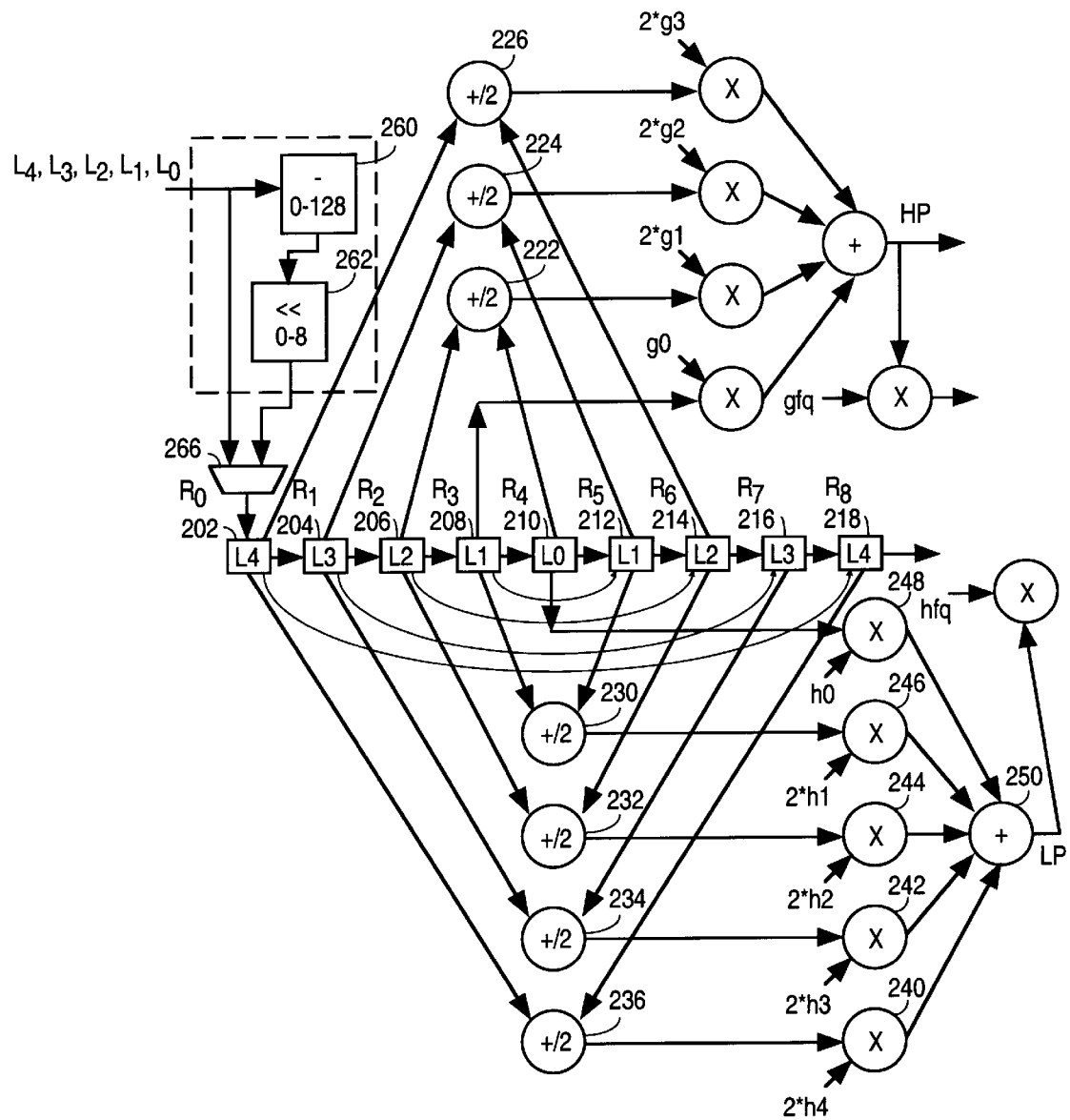
FIG. 7 is a block diagram illustrating the apparatus of FIG. 2 with the low pass elements L0–L4 stored therein.

FIG. 7 illustrates the apparatus of FIG. 2 where low pass elements $L_0$–$L_4$ obtained in the first pass are shifted through registers $R_0$–$R_4$. Then the contents of registers $R_3$–$R_0$ are symmetrically copied, about register R4, to registers $R_5,R_6$, $R_7$, and $R_8$. Note that in this case $L_0$–$L_4$ are not processed by circuits 260 and 262 but rather are directly provided to the shift circuit 201 by multiplexor 266 that selects to the output thereof the input directly coupled to $L_0$, $L_1$, $L_2$, $L_3$ and $L_4$. The apparatus 200 then processes the coefficients Li and Hi in a fashion similar to the fashion in which data elements $d_i$ were processed. In the first step of the second pass coefficients LL0 and HL0 are obtained. In the second step of the second pass coefficients, $LL_1$ and $HL_1$ are obtained and so on.

The running sums of the operations are stored in 32 bit accumulators included in adders 250 and 251. The 32 bit accumulator is advantageous over previous 40 bit and 54 bit accumulators used in digital signal processing. While typically all architectures that perform DWT utilize floating point number representation, the present invention utilizes 16 bit fixed point representation of a fraction. By extracting the 16 left most significant bits of a fraction, one is maintaining as much precision from operation to operation as possible. Since each data element is a 16 bit data element, the results of the additions performed by the add-dividers are also configured to be 16 bit fixed point representations of a fraction.

Converting numbers from a floating point to a fixed point arithmetic is an operation that is well known in the art. On the first pass through apparatus 200, unsigned data elements are converted to fixed point fractions by performing a level shift on the data and normalizing the result. In one embodiment of the present invention, shifting device 260 receives d0–d4 data elements, each having 16 bits, and converts the values of the data elements into fixed point fractions by first subtracting an offset value which in one embodiment of the present invention is 128. The value 128 is subtracted from the value of each data element so that the values of the data elements are between −128 and 127 and, therefore centered around 0.

Further to convert into a fraction the value of the data element from which 128 was subtracted, one divides that value by 256 because the maximum value of a 16 bit digital number is 256. The result of this division is a fraction in the floating point sense. To extract the most significant 16 bits of that number, one needs to multiply the number by $2^{16}$. Multiplying the number by $2^{16}$ and dividing the number by 256 is equivalent to multiplying the number by $2^8$ which is equivalent to shifting in 8 zeros to the left. Circuits 260 and 262 that perform level shifting and normalization operations, respectively are standard off-the-shelf circuits known by persons having ordinary skill in the art. The operations described above with respect to obtaining fixed point numbers are performed only during the first pass.

Figure 8:
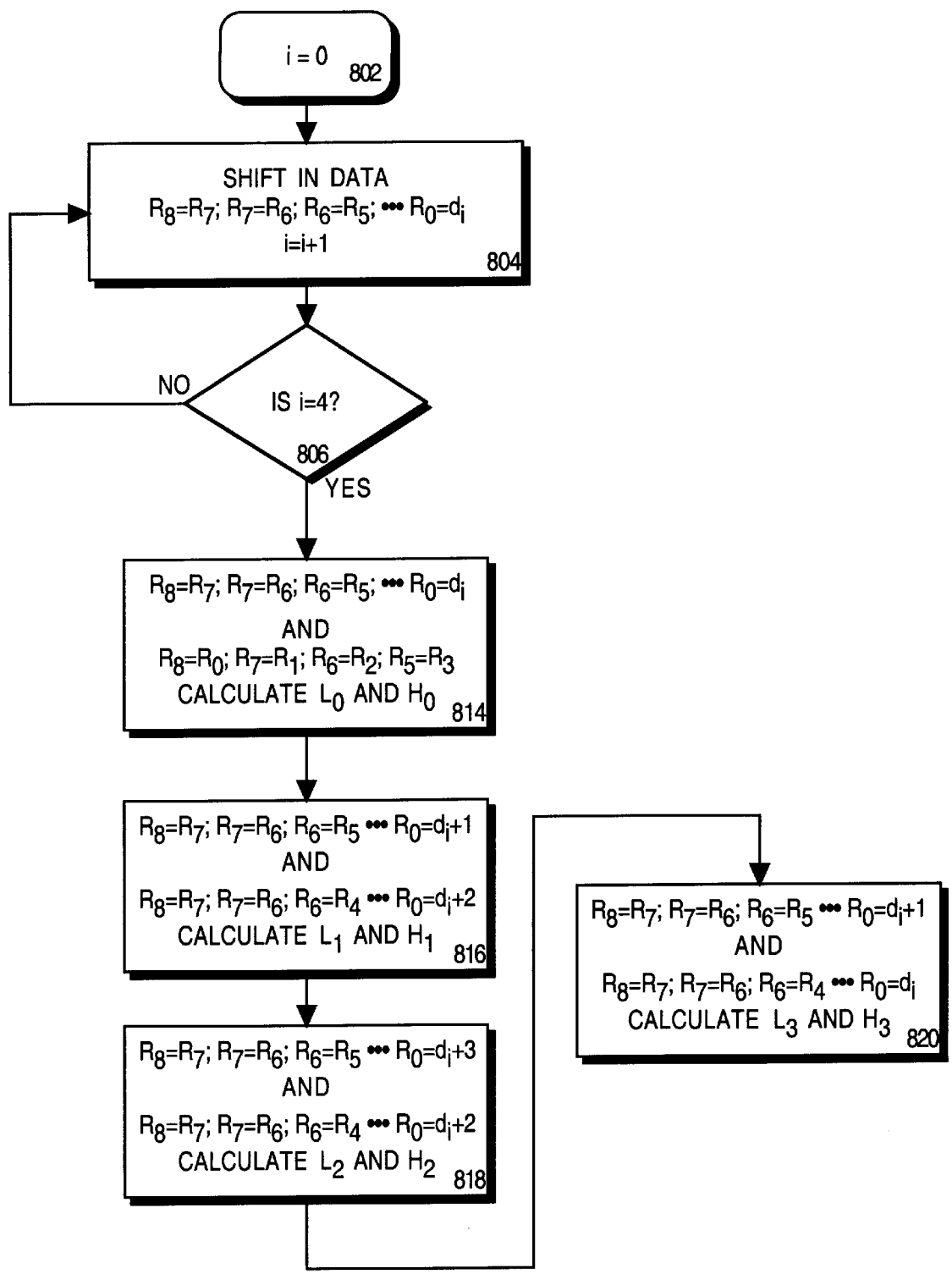
FIG. 8 is a flow chart diagram in connection with an embodiment of a process of obtaining low and high pass coefficients according to the present invention.

FIG. 8 illustrates a flow chart diagram in connection with an embodiment of a process for obtaining coefficients $L_0$–$L_4$ and $H_0$–$H_4$ according to the present invention. The process starts at block 802 where index i is assigned the value "0". The process then flows to block 804 where data in all registers $R_0$ through $R_8$ is shifted to the right by 1. After this step register $R_0$ stores data element $d_0$. Then the index i is assigned a value of i+1. The process then flows to decision block 806 where it is determined whether i=4. In this case, since i=1 the process flows back to block 804 where, again, one new data element is shifted in register $R_0$ and the contents of the other registers are shifted to the right by 1. After this pass, data element $d_1$ is stored in register $R_0$ and data element $d_0$ is stored in register $R_1$. Then the value i is assigned a value "2" and the process flows to decision block 806 where, again, it is determined if i=4. As i equals 4, the process flows back to block 804 where a new data element is shifted into register $R_0$ and the contents of the rest of the registers are shifted to the right by 1. At this step, register $R_0$ stores data element $d_2$, register $R_1$ stores data element $d_1$ and register $R_3$ stores data element $d_0$. Then i is incremented to "3" and the process flows back to decision block 806. The process flows back to block 804 as i is not yet equal to "4". A new data element is shifted into $R_0$ and the contents of the rest of the registers are shifted to the right by one. Data element $d_3$ is stored in register $R_0$, data element $d_2$ is stored in register $R_1$, data element $d_1$ is stored in register $R_2$ and data element $d_0$ is stored in register $R_3$. Index "i" is then incremented by "1" therefore becoming equal to "4". The process flows to block 806 from where it flows to block 814 as i=4. At block 814, data in the registers $R_0$ through $R_8$ is shifted to the right by "1" and register $R_0$ receives the value $d_i$ which is $d_4$. Then the process performs symmetric copying of data about register $R_4$ which stores data element $d_0$. After the symmetric copying of data about register $R_4$ the apparatus that performed this process is configured as illustrated in FIG. 3. Coefficients $L_0$ and $H_0$ are calculated as explained earlier in this description.

The process then follows to block 816 where again data from all registers is shifted to the right by "1" and register $R_0$ receives the value $d_{i+1}$ which is $d_5$. Then at the same block 816, data is again shifted from each register to the right by "1" and register $R_0$ receives data element $d_{i+2}$ which is $d_6$ in this embodiment. Coefficients $L_1$ and $H_1$ are calculated as explained earlier in this description.

From block 816, the process then flows to block 818 where data from the registers is shifted to the right by "1"

and register $R_0$ receives data element $d_{i+3}$ which in this embodiment is $d_7$. Then data elements in the registers are again shifted to the right by "1" and register $R_0$ receives the data element $d_{i+2}$ which is $d_6$. Coefficients $L_2$ and $H_2$ are calculated as explained earlier in this description.

The process then flows to block 820 where data elements are shifted in the registers to the right by "1" and register $R_0$ receives the value $d_{i+1}$. Data is shifted in the registers to the right by "1" and register $R_0$ receives data element $d_i$. Coefficients $L_3$ and $H_3$ are calculated as explained earlier in this description.

In the preceding detailed description, the invention is described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus to perform symmetric filtering image compression, the apparatus comprising:
   a N-element shift circuit, having N shifting blocks (SB), to store and shift data elements, each data element representing a pixel of an image,
   a first plurality of adder circuits to add data elements from a first plurality of pairs of SBs of said N SBs;
   a second plurality of adder circuits to add data elements from a second plurality of pairs of SBs of said N SBs;
   a first plurality of multiplier circuits, to multiply by corresponding low pass coefficients results of additions performed by said first plurality of adder circuits; and
   a second plurality of multiplier circuits, to multiply by corresponding high pass coefficients results of additions performed by said second plurality of adder circuits.

2. The apparatus of claim 1 wherein each SB of said first plurality of pairs of SBs is symmetrically positioned about a first SB.

3. The apparatus of claim 2 wherein said first shifting block is the $((N-1)/2)+1$ block.

4. The apparatus of claim 1 wherein each SB of said second plurality of pairs of SBs is symmetrically positioned about a second SB.

5. The apparatus of claim 4 wherein said second shifting block is the $(N-1)/2$ shifting block.

6. The apparatus of claim 1 wherein said low pass coefficients are symmetrical about a central low pass coefficient.

7. The apparatus of claim 1 wherein said high pass coefficients are symmetrical about a central low pass coefficient.

8. The apparatus of claim 1 wherein said high pass and low pass coefficients implement a 9–7 biorthogonal Spline filter.

9. The apparatus of claim 1 wherein said first $(N-1)/2)+1$ data elements are initially stored in said first $((N-1)/2)+1$ shifting blocks.

10. The apparatus of claim 9 wherein said first $(N-1)/2$ data elements are copied, $(N-1)/2$ shifting blocks portioned symmetrically about shifting block $((N-1)/2)+1$.

11. The apparatus of claim 1 further including a first adder circuit, coupled to said plurality of first multiplier circuits, to add results of multiplications from said plurality of first multipliers.

12. The apparatus of claim 11 further including a second adder circuit, coupled to said plurality of second multiplier circuits, to add therebetween results of multiplications from said plurality of second multipliers.

13. The apparatus of claim 1 further including a circuit to transform incoming data into fixed point data elements.

14. The apparatus of claim 13 further including a circuit to normalize said data elements.

15. A method to perform symmetric filtering image compression, the method comprising:
   storing a plurality of data elements in a N-element shift circuit, that has N shifting blocks, each data element representing a pixel of an image;
   adding data elements from a first plurality of pairs of shifting blocks of said N shifting blocks;
   adding data elements from a second plurality of pairs of shifting blocks of said N shifting blocks;
   multiplying, by corresponding low pass coefficients, results of additions of data elements from said first plurality of shifting blocks; and
   multiplying, by corresponding high pass coefficients, results of additions of data elements from said second plurality of shifting blocks.

16. The method of claim 15 further including adding said results of additions of data elements from sad first plurality of shifting blocks.

17. The method of claim 16 further including adding said results of additions of data elements from sad second plurality of shifting blocks.

18. The method of claim 15, said storing includes converting unsigned data elements to fixed point fractions.

19. The method of claim 18, said converting includes performing a level shift on said data elements.

20. The method of claim 19 said storing further includes performing normalization of said data elements.

21. An apparatus to perform symmetric filtering image compression, the apparatus comprising:
   a N-element shift circuit, having N shifting blocks (SB), to store and shift data elements, each data element representing a pixel of an image;
   a first plurality of add-divider circuits to add data elements from a first plurality of pairs of SB, of said N SB, and to divide by two a first result of the addition;
   a second plurality of add-divider circuits to add data elements from a second plurality of pairs of SB, of said N SB, and to divide by two a second result of the addition;
   a first plurality of multiplier circuits to multiply said first result divided by 2 with corresponding low pass coefficients multiplied by 2; and
   a second plurality of multiplier circuits to multiply said second result divided by 2, with corresponding high pass coefficients multiplied by two.

22. The apparatus of claim 21 wherein each SB of said first plurality pairs of SBs is symmetrically positioned about a first SB.

23. The apparatus of claim 21 wherein each SB of said second plurality of pairs of SBs is symmetrically positioned about a second SB.

24. The apparatus of claim 21 wherein said low pass coefficients are symmetrical about a central low pass coefficient.

25. The apparatus of claim 21 wherein said high pass coefficients are symmetrical about a central low pass coefficient.

* * * * *